United States Patent

[11] 3,559,528

| [72] | Inventor | Zed Cunningham |
| | | 4104 Green Court, Cleveland, Ohio 44104 |
| [21] | Appl. No. | 869,809 |
| [22] | Filed | Oct. 27, 1969 |
| [45] | Patented | Feb. 2, 1971 |

[54] WEAPONS SYSTEM FOR MOTOR VEHICLES
2 Claims, 4 Drawing Figs.

[52] U.S. Cl. .................................................. 89/40
[51] Int. Cl. ............................................. F41f 23/10
[50] Field of Search ..................................... 89/36T, 37, 37B, 37B1, 40.11, 40.12

[56] References Cited
UNITED STATES PATENTS

| 1,150,748 | 8/1915 | Doyle | 89/40(.11) |
| 1,342,943 | 6/1920 | Cunard | 89/36(T) |
| 1,433,708 | 10/1922 | Fenton | 89/36(T) |
| 1,791,701 | 2/1931 | Beal | 89/36(T) |
| 2,051,753 | 8/1936 | Steckly | (89/36TUX) |
| 2,303,327 | 12/1942 | Coupland | 89/37(B) |
| 2,363,573 | 11/1944 | Costa | 89/36(T) |
| 3,380,406 | 4/1968 | Gosnell | (89/36AUX) |

Primary Examiner—Benjamin A. Borchelt
Assistant Examiner—Stephen C. Bentley
Attorney—Robert G. McMorrow

ABSTRACT: A weapon system for a motor vehicle in which a gun rest is pivotally mounted on the vehicle dash panel. The windshield of the vehicle has an opening therein, and a cover plate for the opening is movably mounted to provide a selective closure for the opening.

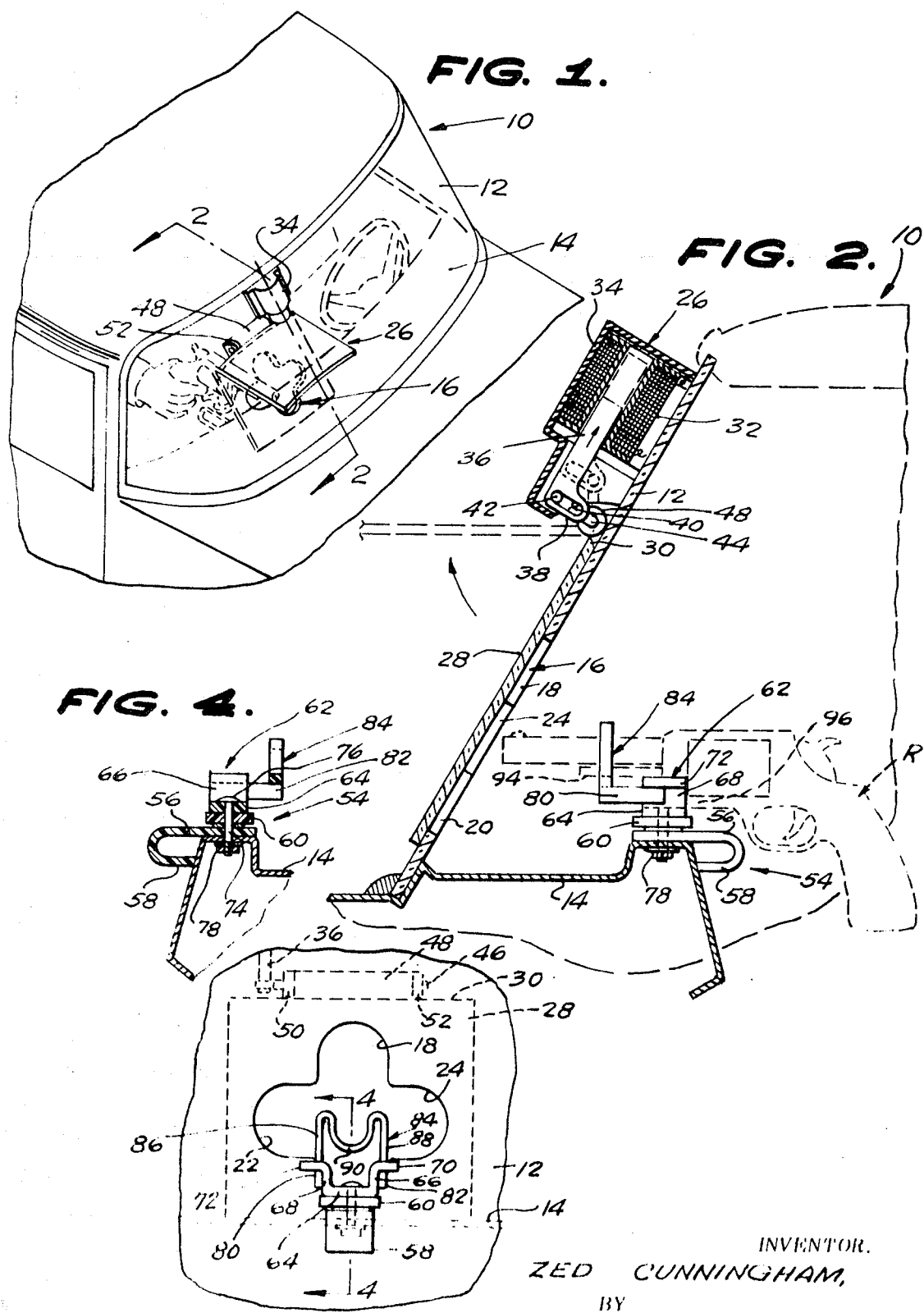

WEAPONS SYSTEM FOR MOTOR VEHICLES

BACKGROUND OF THE INVENTION

1. Field of the Invention

This invention pertains to new and novel means for mounting of firearms in vehicles, such as vehicles employed in law enforcement activities.

2. Statement of the Prior Art

It has heretofore been proposed that firearms be mounted on vehicles, as shown for example in prior U.S. Pat. No. 2,143,900. However, such previously proposed mountings have not met with general acceptance, largely due to the fact that they encumber the vehicle with apparatus which interferes with its other functions, and moreover, they preclude the firing of the weapon from within the vehicle as is often necessary in high speed chase operations. Further, weapons are difficult to accurately aim during vehicle operation and the previously proposed mounts have not aided in the sighting function of the weapons.

SUMMARY OF THE INVENTION

The present invention is directed to a weapon system for law enforcement vehicles and the like, the system employing conventional firearms and providing improved rests therefor. A major objective of the invention resides in the provision of a combined rest and aiming assembly which enables the user to brace the firearm and to effectively aim it during the disturbance encountered when a vehicle is operating at high speeds.

A further objective of the invention resides in the provision of means for effective firing of a weapon from within a moving vehicle without the necessity for firing from a window. In the arrangement herein disclosed, the vehicle windshield is provided with a port for firing, and the port has closure means in the form of a movable transparent plate, or the like. Thus, the port may be opened by movement of the plate to expose it, thereby permitting firing of the weapon from within the vehicle, and further permitting the safe operation of the vehicle without blockage of the windshield when the weapon is not in use.

Other and further objects and advantages of the invention will become apparent to those skilled in the art from a consideration of the following specification when read in conjunction with the annexed drawing.

BRIEF DESCRIPTION OF THE DRAWING

FIG. 1 is a perspective view of a portion of a vehicle adapted to embody the weapon system of this invention;

FIG. 2 is an enlarged cross-sectional view, taken substantially one line 2-2 of FIG. 1, looking in the direction of the arrows;

FIG. 3 is an elevational view of a portion of the apparatus; and

FIG. 4 is a detail sectional view of the apparatus of FIG. 3, taken on line 4-4 of that FIG., looking in the direction of the arrows.

DESCRIPTION OF THE PREFERRED EMBODIMENT

Referring to the drawing in greater detail, a vehicle such as a police cruiser is identified in FIGS. 1 and 2 by general reference character 10. The vehicle 10 includes a windshield 12 and an interior substantially horizontal dash panel 14.

A port 16 is formed in the windshield, and is of cross form, including upper and lower opening sections 18, 20 and side opening sections 22 and 24. Thus, a range of vertical and lateral aiming through the port is made possible. An important feature of this invention resides in the provision of closure means for the port 16. In this embodiment of the invention, the closure means comprises a closure assembly 26 including a transparent plate 28 having a top edge 30. An electric motor 32, in a mounting casing 34, has an extensible and retractable member 36 which is movable to the positions shown in full and phantom lines in FIG. 2. The member 36 has an end section 38 with an elongated slot 40 formed therein. A pin 42 is engaged in the slot captively and forms the end of a crank arm 44. The arm 44 is fixedly connected to a rod 46 which is secured to a sleeve 48. The sleeve 48 is fixed to the plate upper end. The rod 46 is journaled in ears 50, 52 which are apertured to receive the rod and which are fixed to the windshield. Thus, torsional force applied to the rod through extension or retraction of the member 36 causes the pin 42 to ride in the slot 40 and to turn the crank 44. This twisting of the crank results in pivotal movement of the plate. In the uppermost position of the member 36, the plate 28 is pivoted to a raised position clear of the port 16, while in the depressed position of the element 36, the plate effectively covers the port.

The motor is actuable by suitable means operated from within the vehicle. Such actuation effects movement of the plate 28 away from the opening 16.

A second important assembly of the within described weapon system comprises a combined rest and aiming assembly 54. The assembly 54 is mounted on the dash panel 14, preferably adjacent to and in alignment with the port 16.

The assembly 54 comprises a strap element 56 secured to the upper wall of the panel 14, and having a reverted section 58 which engages the panel forward wall for rigidity of the mount. A washer 60 is disposed above the strap element, and spaces it from a saddle 62, comprising a horizontal bight portion 64 and vertical side arms 66, 68. Each of the arms terminates in a lateral, outward flange 70, 72, respectively. A bolt 74, held in place by enlarged head 76 and a nut 78, extends through the bight portion 64, member 60, strap element 56 and panel 14.

Extending forwardly from the opposite sides of the arms 66 and 68 is a pair of horizontal members 80, 82. A sight member 84, comprising vertical legs 86, 88 and a U-sahped seat 90, bridges the horizontal member.

The present apparatus is particularly adapted for use with a sidearm such as a revolver R. The latter type of weapon has a frame with a barrel and actuator rod 94, and a cylinder frame 96. The revolver may be readily positioned in the assembly 54, with the cylinder frame 96 resting in the saddle, and with the actuator rod 94 disposed in the seat 90. The legs 86 and 88 extend above the barrel, as shown in FIG. 2, when the frame is so situated, thus providing an effective, enlarged sighting means for firing the weapon through the port 16. The swivel mounting of the saddle and sighting assembly permits the revolver to be effectively braced against undesirable movement during firing and to be effectively aimed despite the fact that the conventional aiming means cannot be readily employed during vehicle movement.

The scope of the invention is defined in the appended claims.

I claim:

1. In a vehicle having a dash panel and having a windshield adjacent the dash panel, the windshield having an opening formed therein, the opening having both a lateral and a vertical extent, a weapons system comprising:

closure means normally positioned over the windshield opening, comprising a transparent plate having a pivot rod secured thereto;

a closure actuating assembly including a casing fixed to the windshield and having a motor therein, the motor having an extendable and retractable member connected to the pivot rod to effect pivotal movement of the transparent plate upon extension and retraction;

means for movably mounting a firearm on the dash panel in a position adjacent the windshield opening, including a generally U-shaped saddle;

the saddle including a bight portion pivotally mounted on the dash panel, and a pair of generally horizontal arms extending forwardly;

sight means, including a sight member having a pair of vertical legs and a U-shaped seat, secured to said horizontal arms; and a firearm including a frame and a barrel removably supported in said saddle, with the frame engaged in the saddle and the barrel positioned in the U-shaped seat.

2. The invention of claim 1, wherein:
the transparent plate has a sleeve on its upper end;
the pivot rod is secured to the sleeve and has a crank arm thereon;
the extendable and retractable member having an elongated slot therein; and
the crank arm extending into the slot.